(12) United States Patent
Miki

(10) Patent No.: US 6,697,323 B1
(45) Date of Patent: Feb. 24, 2004

(54) OPTICAL RECORDING MEDIUM AND METHOD OF MANUFACTURING INCLUDING SMOOTHING TREATMENT

(75) Inventor: Takeshi Miki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/552,758

(22) Filed: Apr. 19, 2000

(30) Foreign Application Priority Data

Apr. 22, 1999 (JP) .......................... P11-115128

(51) Int. Cl.⁷ .............................. G11B 7/24; B32B 3/02
(52) U.S. Cl. .................................. 369/275.1; 428/64.4
(58) Field of Search .................. 369/275.1, 275.3, 369/13, 275.2, 13.35, 283, 275.4, 285, 288, 13.39; 428/64.1, 64.4, 64.5, 64.6, 64.3, 64.8, 694 BP, 696 DE, 694 TP; 430/495.1

(56) References Cited

U.S. PATENT DOCUMENTS

| 5,568,466 A | * | 10/1996 | Komaki et al. | .......... | 369/275.2 |
| 5,580,633 A | * | 12/1996 | Kuwahara et al. | ......... | 428/64.3 |
| 6,127,017 A | * | 10/2000 | Hirata et al. | ............... | 428/64.1 |
| 6,159,572 A | * | 12/2000 | Kobayashi et al. | ........ | 428/64.1 |

* cited by examiner

*Primary Examiner*—Ali Neyzari
(74) *Attorney, Agent, or Firm*—Sonnenschein, Nath & Rosenthal LLP

(57) ABSTRACT

Provided are an optical recording medium and a method of manufacturing the optical recording medium, in which a reflective film, a dielectric film and a recording film are sequentially formed on a substrate, light being irradiated from an opposite side to the substrate, thereby causing recording and/or reproduction on the recording film to be carried out. At least one of surfaces of the reflective film and the dielectric film is subjected to a smoothing treatment by sputter etching for making a surface roughness equal to 0.75 nm or less. Thus, it is possible to reduce disk noises such as an erasing noise, a recording noise and the like.

8 Claims, 5 Drawing Sheets

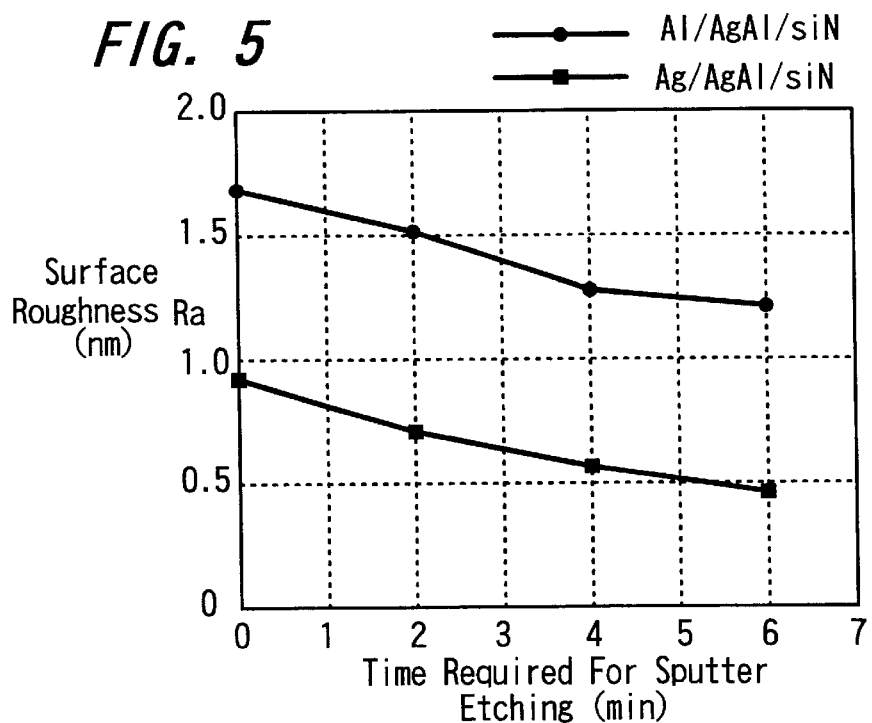
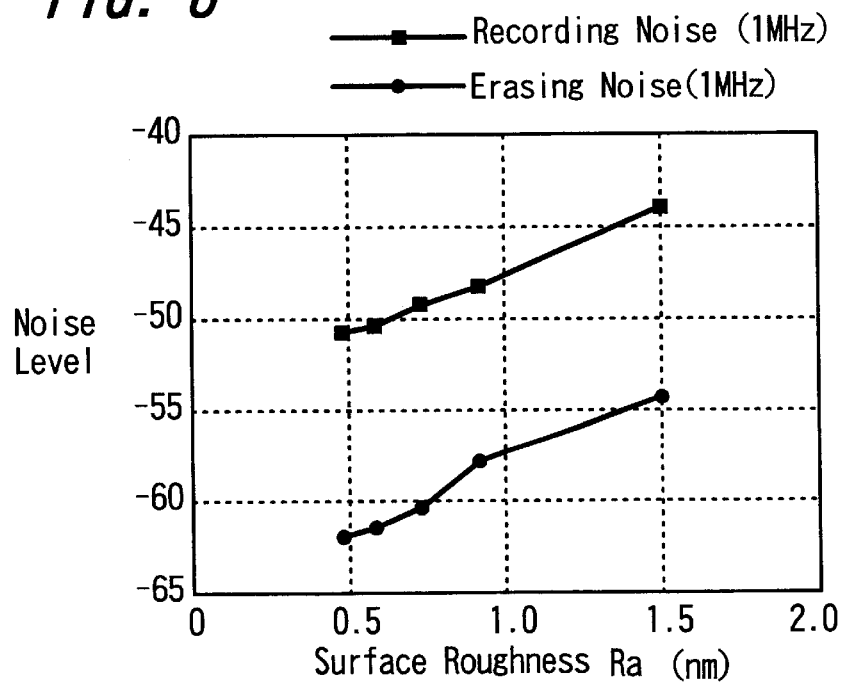

OPTICAL RECORDING MEDIUM AND METHOD OF MANUFACTURING INCLUDING SMOOTHING TREATMENT

BACKGROUND OF THE INVENTION

1. Field of the Invention

The present invention relates to an optical recording medium and a method of manufacturing the optical recording medium.

2. Description of the Related Art

In recent years, attention has been paid to an optical recording medium as a high density recording medium.

FIG. 1 is a sectional view showing a conventional example of an optical magnetic recording medium of the optical recording medium.

The optical magnetic recording medium has such a structure that a dielectric film 3, a recording film 4 formed of a magnetic film, a dielectric film 5 and a reflective film 6 formed of a metal are sequentially layered on a transparent substrate 2 composed of polycarbonate or the like for example. A laser beam 9 is irradiated from the transparent substrate 2 side to record and reproduce a signal.

On the other hand, the following optical magnetic recording medium has been developed for higher density recording.

This is such that, for example, a reflective film, a dielectric film, a recording film, a dielectric film and an organic protective film are sequentially layered on a substrate. A laser beam is irradiated from the organic protective film side opposite to the substrate for recording and reproducing a signal (hereinafter referred to as a "surface reading optical magnetic recording medium").

In the surface reading optical magnetic recording medium, however, disk noises such as an erasing noise, a recording noise and the like are disadvantageously made greater than those in the conventional optical magnetic recording medium for recording and reproducing by laser beam irradiation from the transparent substrate side.

In the optical magnetic recording medium, the recording noise is made by the reproduction after converging and irradiating a laser beam to perform recording while giving a magnetic field from the outside at a constant frequency.

The erasing noise is a DC erase noise which is made when reproduced a signal after converging and irradiating a laser beam to erase a recorded signal while giving a magnetic field from the outside in one direction.

In consideration of such a problem, it is an object of the present invention to provide an optical recording medium capable of reducing disk noises such as the erasing noise, the recording noise and the like and a method of manufacturing the optical recording medium.

SUMMARY OF THE INVENTION

The present invention provides a method of manufacturing an optical recording medium in which light is irradiated from an opposite side to a substrate, thereby causing recording and/or reproduction on a recording film to be carried out, comprising the steps of preparing a substrate, forming a reflective film on the substrate, carrying out a smoothing treatment on a surface of the reflective film and forming a recording film on the reflective film.

Moreover, the present invention provides a method of manufacturing an optical recording medium in which light is irradiated from an opposite side to a substrate, thereby causing recording and/or reproduction on a recording film to be carried out, comprising the steps of preparing a substrate, sequentially forming a reflective film and a dielectric film on the substrate, carrying a smoothing treatment on at least one of surfaces of the reflective film and the dielectric film and then forming a recording film on the dielectric film.

Furthermore, the present invention provides an optical recording medium in which at least a reflective film and a recording film are formed on a substrate and light is irradiated from an opposite side to the substrate for carrying out recording and/or reproduction on the recording film, wherein the reflective film has a surface roughness Ra of 0.75 nm or less.

Moreover, the present invention provides an optical recording medium in which at least a reflective film, a dielectric film and a recording film are sequentially formed on a substrate and light is irradiated from an opposite side to the substrate for carrying out recording and/or reproduction on the recording film, wherein the dielectric film has a surface roughness Ra of 0.75 nm or less.

According to the optical recording medium and the method of manufacturing the same in accordance with the present invention, the surface of the reflective film is subjected to the smoothing treatment. Therefore, it is supposed that scattered light on the reflective film can be reduced.

According to the optical recording medium and the method of manufacturing the same in accordance with the present invention, at least one of the surfaces of the reflective film and the dielectric film is subjected to the smoothing treatment. Consequently, it is supposed that the scattered light on the reflective film can be reduced and/or magnetic characteristics can be enhanced by flattening the recording film.

This object as well as other objects, features and advantages of the invention will become more apparent to those skilled in the art from the following description with reference to the accompanying drawings.

BRIEF DESCRIPTION OF THE DRAWINGS

FIG. 5 is a graph showing the influence of a time required for sputter etching on a surface roughness Ra in the case in which a laminated film of Al/AgAl or a laminated film of Ag/AgAl is subjected to sputter etching for a constant time and a SiN film is then provided thereon;

FIG. 6 is a graph showing the relationship between the surface roughness Ra and a noise level for an optical magnetic recording medium in which a recording layer, a dielectric film and an organic protective film are formed on the laminated film obtained in the example illustrated in FIG. 5.

DETAILED DESCRIPTION OF THE PREFERRED EMBODIMENT

An embodiment of the present invention will be described below.

First of all, the structure of an optical recording medium according to the present invention will be described with reference to FIG. 2.

Figure 2:
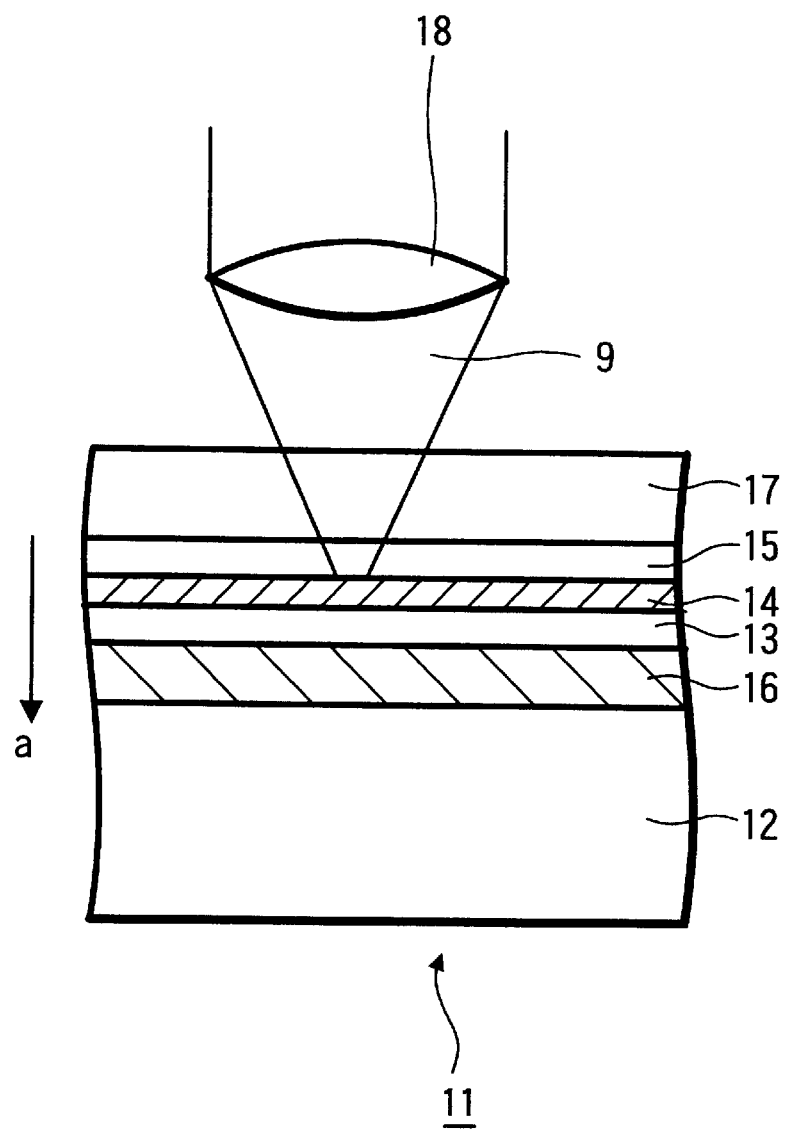
FIG. 2 is a sectional view showing an example of an optical recording medium according to the present invention.

FIG. 2 is a sectional view showing an optical magnetic recording medium according to an example of the optical recording medium in accordance with the present invention. As is apparent from FIG. 2, an optical recording medium 11 is constituted by a substrate 12, a reflective film 16, a dielectric film 13, a recording film 14, a dielectric film 15 and a light transmission film 17.

The substrate 12 is disk-shaped in a thickness of 0.1 to 1.2 mm. The substrate 12 is formed of a transparent material such as glass, polycarbonate, an acrylic resin (for example, PMMA), an epoxy resin and the like. However, it is not restricted to the transparent material but an opaque material may be used. Moreover, the substrate 12 has the function of supporting various thin films to be layered thereon.

The reflective film 16 is formed on the substrate 12. The reflective film 16 has a thickness of 30 to 100 nm.

For the material of the reflective film 16, Al, Ag, an Al alloy, an Ag alloy or the like is used. Moreover, the reflective film 16 is a single layer film composed of one of these metals or an alloy or is a laminated film having two or more layers.

The reflective film 16 has the function of reflecting a laser beam transmitted through a recording film (described below) to pass the laser beam through the recording film again.

The surface of the reflective film 16 is subjected to a smoothing treatment. The smoothing treatment of the reflective film 16 will be described below in detail.

The dielectric film 13 is formed on the reflective film 16. The dielectric film 13 has a thickness of 150 nm or less. Moreover, the dielectric film 13 is composed of SiO, Tb added $SiO_2$, SiN, AlNx, $Y_2O_3$, $Al_2O_3$, ZnS or the like. The dielectric film 13 has the function of preventing the oxidation of the recording film which easily rusts, and the function of enhancing an apparent Kerr rotating angle due to the effects of multipath reflection and interference.

The dielectric film 13 is not always formed of a single layer film, but may be a laminated film having two or more layers.

The recording film 14 is formed on the dielectric film 13. The recording film 14 has a thickness of 5 to 30 nm. Moreover, the recording film 4 is formed of an amorphous rare earth-transition metal alloy such as TbFeCo, GdFeCo or the like. The recording film 14 is a film whose magnetizing direction is perpendicular to a film surface (hereinafter referred to as a "perpendicular magnetic film"). A portion to be recorded in the recording film 14, is locally heated by a laser beam, a magnetic field being given in the reverse direction and the magnetization of the portion being inverted, so that a bit is recorded.

The recording film 14 is not always formed of a single layer film but may be formed of a laminated film having two or more layers.

The dielectric film 15 is formed on the recording film 14. The dielectric film 15 has the same thickness, material and function as those of the dielectric film 13 described above.

The light transmission film 17 is formed on the dielectric film 15. The light transmission film 17 has a thickness of 100 µm or less. Moreover, the light transmission film 17 is formed of an ultraviolet curing resin.

The light transmission film 17 has functions to prevent the dielectric film 15, the recording film 14, the dielectric film 13 and the reflective film 16 provided thereunder from being exposed to an external environment such as oxygen, moisture or the like and also prevent refuse, dust or the like from sticking to the dielectric film 5, and furthermore, preventing these laminated films from being damaged by coming in contact with other objects.

Next, description will be given to a recording and reproducing method when the optical recording medium according to the present invention is used.

In the optical recording medium 11 shown in FIG. 2, a laser beam 19 is irradiated from the opposite side to the substrate 12. The recording film 14 is heated to a Curie temperature or more by absorbing heat of the laser beam 19. When the recording film 14 is heated to a temperature which exceeds the Curie temperature, the coercive force of the magnetized recording film 14 is considerably lowered. By utilizing this phenomenon, the direction of the magnetization is recorded on the recording film 14 in the forward-backward binary form.

Together with the laser beam 19 for heating to the Curie temperature or more, a magnetic field is applied in the opposite direction to the direction a of the magnetization which has previously been extended over the whole recording film 14. When the laser beam 19 is blocked, the recording film 14 returns to an ordinary temperature from the high temperature. If the amorphous rare earth-transition metal alloy or the like is used for the recording film 14, the recording film 14 cools while the applied magnetic field direction at the Curie temperature is recorded. Accordingly, the direction of magnetization of the recording film is inverted in only a portion to which the laser beam 19 and an external inverted magnetic field are simultaneously applied. Thus, information is recorded.

When the laser beam is converged and irradiated again by setting the direction of a magnetic filed applied from the outside at the "a" direction, a recorded signal can be erased.

When the recorded signal is to be reproduced, the properties of the laser beam 19 as a wave are utilized unlike from the case of recording and erasing.

A laser beam emitted from a semiconductor laser is a linearly polarized wave light which is generally excellent. In order to further improve the linearly polarized wave properties, the laser beam is also irradiated on the recording film of the optical recording medium through a polarizing plate. The polarized wave plane of the laser beam reflected from the recording film 14, namely, the direction of oscillation of the light thereof rotates in the direction opposite to each other according to the direction of magnetization of the recording film 14. Therefore, information is reproduced by detecting the direction of the rotation.

The magnetic Kerr effect for reflected light and the Faraday effect for transmitted light are utilized for the interaction of a light wave and a magnetic field which is obtained during recorded information reproduction, namely, a magneto-optical effect.

Further, the optical recording medium according to the present invention can record and/or reproduce information.

The optical recording medium 11 shown in FIG. 2 is a surface reading optical magnetic recording medium as described above. This surface reading optical magnetic recording medium enables high density recording to be carried out.

The high density recording can be carried out for the following reason. By setting the thickness of the organic protective film greater than that of the substrate, the numerical aperture NA of a lens can be increased. Therefore, a beam spot size in the focal point of the lens can be reduced.

Next, description will be given to a method of manufacturing the optical recording medium according to the present invention.

In the manufacturing method, first of all, the reflective film 16 is formed on the substrate 12 by a sputtering method.

The sputtering conditions of the reflective film 16 are as follows.

Ar gas pressure: 0.1 to 0.2 Pa power: 0.2 to 1 kW

After the sputtering step, the surface of the reflective film 16 is subjected to a smoothing treatment. The smoothing treatment of the reflective film 16 will be described below in detail.

Next, the dielectric film 13 is formed on the reflective film 16 by the sputtering method. The dielectric film 13 may be a laminated film having two or more layers if necessary.

The sputtering conditions of the dielectric film 13 are as follows.

In the mixed atmosphere of Ar and $N_2$, gas pressure: 0.3 to 0.4 Pa power: 1.0 to 1.5 kW Then, the recording film 14 is formed on the dielectric film 13 by the sputtering method. The recording film 14 may be a laminated film having two or more layers if necessary.

The sputtering conditions of the recording film 14 are as follows.

Ar gas pressure: 0.2 to 0.3 Pa two-layered film composed of TbFeCo and GdFeCo

Thereafter, the dielectric film 15 is formed on the recording film 14 by the sputtering method. The dielectric film 15 may be a laminated film having two or more layers if necessary. A method of forming the dielectric film 15 is the same as the method described about the dielectric film 13.

Subsequently, the light transmission film 17 is formed on the dielectric film 15. The light transmission film 17 is formed by a spin coating method.

Next, description will be given to the influence of the surface roughness of the reflective film 16 on disk noises such as an erasing noise, a recording noise and the like with reference to FIGS. 3 to 7.

First of all, the surface roughness of a metal thin film which is a reflective film will be described with reference to FIG. 3.

Figure 3:
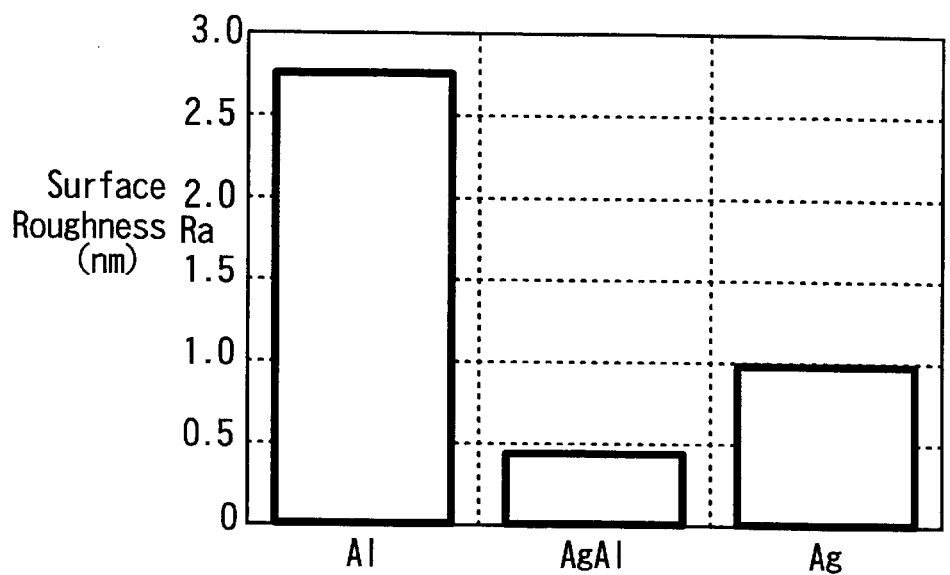
FIG. 3 is a chart showing a result of measurement of a surface roughness Ra for an Al thin film, an AgAl thin film and an Ag thin film which are formed on a substrate.

FIG. 3 is a chart showing a result of measurement of a surface roughness Ra for an Al thin film, an AgAl thin film and an Ag thin film which are formed on the substrate.

As shown in FIG. 3, an axis of abscissa indicates a used sample, that is, a sample of each of the Al thin film, the AgAl thin film and the Ag thin film, and an axis of ordinate indicates a surface roughness Ra (nm) for the sample.

In this regard, description will be given to a method of fabricating the samples of the Al thin film, the AgAl thin film and the Ag thin film.

The Al thin film having a thickness of 30 nm is formed on a glass substrate having a thickness of 1 mm by the sputtering method on the condition of an Ar gas pressure of 0.2 Pa and a power of 600 W.

The AlAg thin film having a thickness of 30 nm is formed on a glass substrate having a thickness of 1 mm by the sputtering method on the condition of an Ar gas pressure of 0.2 Pa, a power of Al 600 W and Ag 200 W, and a composition ratio of a target of Ag:Al=1:1.

For the AgAl alloy, a range of Ag:Al=2:8 to 8:2 can be used in addition to the above-mentioned composition ratio.

The Ag thin film having a thickness of 30 nm is formed on a glass substrate having a thickness of 1 mm by the sputtering method on the condition of an Ar gas pressure of 0.2 Pa and a power of 400 W.

Next, the surface roughness Ra will be described.

The surface roughness Ra is referred to as a center line mean roughness. A portion having a measured length L is extracted from a roughness curve along a center line. When the center line of the extracted portion is represented as an X axis, the direction of a depth magnification being represented as a Y axis and the roughness curve being represented as y=f (x), the center line mean roughness is defined as a value obtained by integrating the absolute value of the roughness curve and dividing the integral value by the measured length L.

The surface roughness Ra was measured using an AFM (Atomic Force Microscopy) (trade name: SPM NANOSCOPE III manufactured by Digital Instruments Co., Ltd.).

The measuring method is such that observes the shape of a surface by detecting and scanning, atomic force between specimens using of a sharp probe.

From the result of the measurement shown in FIG. 3, it can be seen that when the surface roughness Ra of the film is measured for a material such as Ag or AgAl in addition to Al which has conventionally been used for the material of a reflective film, various values are obtained depending on the material.

In other words, the Al thin film has a surface roughness Ra of approximately 2.76 nm which is a very great value.

The glass substrate has a surface roughness Ra of 0.3 nm. Thus, it is apparent that the surface roughness Ra of the Al thin film has a greater value than the surface roughness Ra of the glass substrate.

The AgAl thin film has a surface roughness Ra of approximately 0.4 nm which is a much smaller value than in the Al thin film.

It is clear that the surface roughness Ra of the AgAl thin film is almost equal to the surface roughness of the glass substrate, that is, 0.3 nm.

The Ag thin film has a surface roughness Ra of approximately 1.0 nm which is about twice as much as the surface roughness Ra of the AgAl thin film.

It is apparent that the surface roughness Ra of the Ag thin film is greater than the surface roughness of the glass substrate, that is, 0.3 nm.

From these results, the surface roughness Ra of the Al thin film is very great and the surface roughness Ra goes smaller in order of the Ag thin film and the AgAl thin film.

As compared with the surface roughness Ra of the glass substrate, the surface roughness Ra of the Ag thin film is great and that of the Al thin film is much greater. However, the surface roughness Ra of the AgAl thin film is almost equal to that of the glass substrate.

Next, description will be given to the surface roughness Ra of a laminated film made of a metal film and a dielectric film with reference to FIG. 4.

Figure 4:
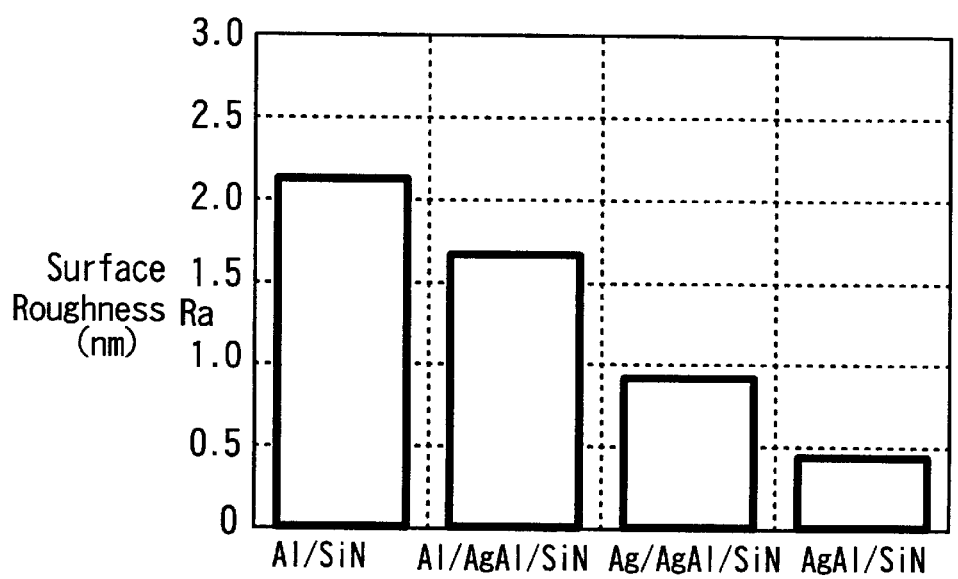
FIG. 4 is a chart showing a result of measurement of a surface roughness Ra for a laminated film of Al/SiN, a laminated film of Al/AgAl/SiN, a laminated film of Ag/AgAl/SiN and a laminated film of AgAl/SiN which are formed on the substrate.

FIG. 4 is a chart showing a result of measurement of a surface roughness Ra for a laminated film of Al/SiN, a laminated film of Al/AgAl/SiN, a laminated film of Ag/AgAl/SiN and a laminated film of AgAl/SiN.

As shown in FIG. 4, an axis of abscissa indicates each of samples of the Al/SiN laminated film, the Al/AgAl/SiN laminated film, the Ag/AgAl/SiN laminated film and the AgAl/SiN laminated film, and an axis of ordinate indicates a surface roughness Ra (nm) for each sample.

In this regard, description will be given to a method of fabricating each sample.

The Al/SiN laminated film is fabricated as follows. An Al thin film having a thickness of 30 nm is formed on a glass substrate having a thickness of 1 mm by the sputtering method on the condition of an Ar gas pressure of 0.2 Pa and a power of 600 W.

Then, a SiN thin film having a thickness of 20 nm is formed on the Al thin film by the sputtering method on the condition of a gas pressure of 0.3 Pa and a power of 1.2 kW in the mixed atmosphere of Ar and $N_2$.

The Al/AgAl/SiN laminated film is formed as follows. An Al thin film having a thickness of 20 nm is formed on a glass substrate having a thickness of 1 mm on the same condition as the condition of the formation of the Al thin film described above.

Then, an AgAl thin film having a thickness of 30 nm is formed on the Al thin film by the sputtering method on the condition of an Ar gas pressure of 0.2 Pa, a power of Ag 200 W and Al 600 W.

Thereafter, a SiN thin film having a thickness of 20 nm is formed on the AgAl thin film on the same condition as the condition of the formation of the SiN thin film described above.

The Ag/AgAl/SiN laminated film is formed as follows. An Ag thin film having a thickness of 20 nm is formed on a glass substrate having a thickness of 1 mm on the condition of an Ar gas pressure of 0.2 Pa and a power of 400 W.

Then, an AgAl thin film having a thickness of 30 nm is formed on the Ag thin film on the same condition as the condition of the formation of the AgAl thin film described above.

Thereafter, a SiN thin film having a thickness of 20 nm is formed on the AgAl thin film on the same condition as the condition of the formation of the SiN thin film described above.

The AgAl/SiN laminated film is formed as follows. An AgAl thin film having a thickness of 30 nm is formed on a glass substrate having a thickness of 1 mm on the same condition as the condition of the formation of the AgAl thin film described above. A SiN thin film having a thickness of 20 nm is formed next on the AgAl thin film on the same condition as the condition of the formation of the SiN thin film described above.

As can be seen from FIG. 4, the surface roughness Ra of the laminated film has different values depending on the material.

In other words, the Al/SiN laminated film has a surface roughness of approximately 2.1 nm. This value is slightly smaller than the surface roughness of the Al thin film in FIG. 3, that is, 2.75 nm.

Figure 1:
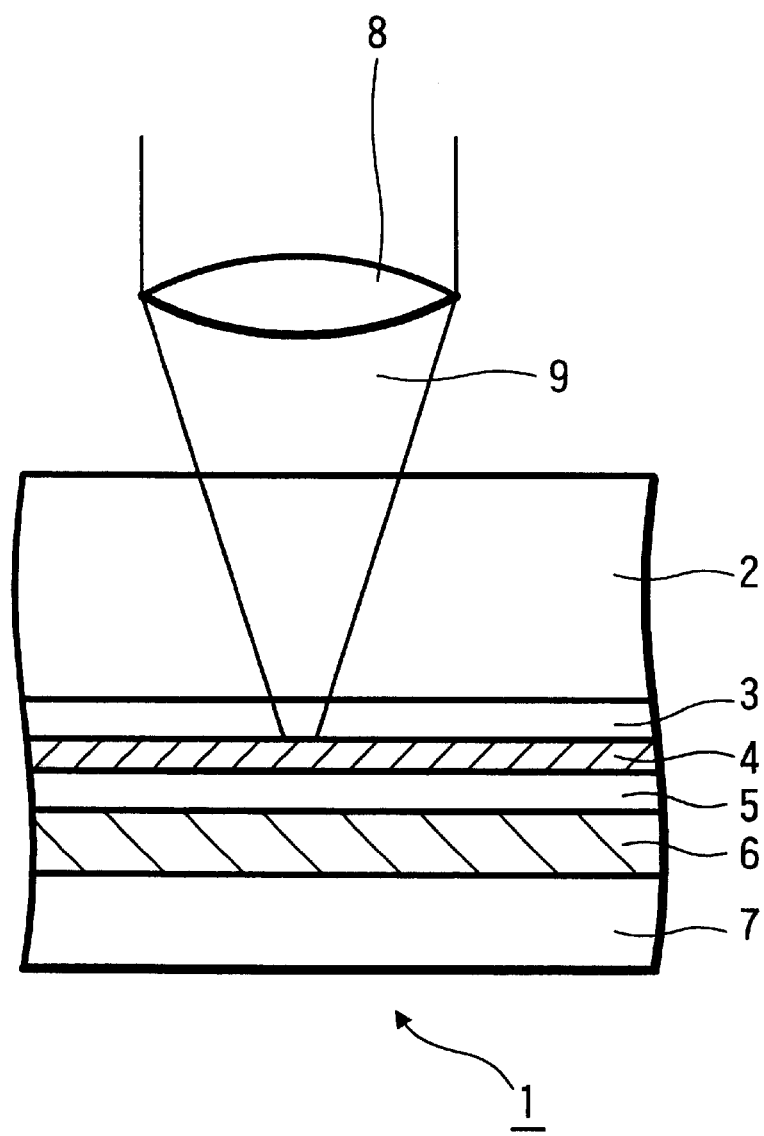
FIG. 1 is a sectional view showing a conventional example of an optical magnetic recording medium.

In the conventional optical recording medium described with reference to FIG. 1, the SiN thin film being the dielectric film formed on the substrate 2 has a surface roughness Ra of 0.4 to 0.5 nm.

Accordingly, the Al/SiN laminated film is supposed as follows. When the SiN thin film is layered on the Al thin film as a lower layer, the SiN slightly fills in the concave portions of the Al thin film, but the surface roughness of the Al thin film influences the SiN thin film.

The Al/AgAl/SiN laminated film has a surface roughness Ra of approximately 1.7 nm. This value is slightly smaller than the surface roughness of the Al/SiN thin film, that s, 2.1 nm.

The surface roughness Ra of the AgAl thin film in FIG. 3 has a small value of 0.4 nm.

Accordingly, the Al/AgAl/SiN laminated film is supposed as follows. When the AgAl thin film and the SiN thin film are layered on the Al thin film as a lower layer, the AgAl slightly fills in the concave portions of the Al thin film and further the SiN slightly fills in concave portions of the Ag Al thin film, but the surface roughness of the Al thin film influences the SiN thin film.

The Ag/AgAl/SiN laminated film has a surface roughness of approximately 0.9 nm. This value is slightly smaller than the surface roughness of the Ag thin film in FIG. 3, that is, approximately 1.0 nm. It is supposed that the reason why the surface roughness of the Ag thin film is smaller is the same as in the Al/AgAl/SiN laminated film. However, as compared with the case of the Al/AgAl/SiN laminated film, it is supposed that the lamination of the AgAl thin film and the SiN thin film on the Ag thin film has small effects.

Also in the case of the Ag/AgAl/SiN laminated film, however, it is apparent that the AgAl slightly fills in concave portions of the Ag thin film and the SiN slightly fills in concave portions of the AgAl thin film, but the surface roughness of the Ag thin film influences the SiN thin film.

The AgAl/SiN laminated film has a surface roughness of approximately 0.4 nm. This value is equal to the surface roughness of the AgAl thin film in FIG. 3, that is, approximately 0.4 nm. The reason seems such that the surface roughnesses Ra of both the AgAl thin film and the SiN thin film are small.

From these results, when the SiN thin film being a dielectric thin film having a small surface roughness Ra is layered on a metal thin film having a great surface roughness Ra as well as when a metal thin film having a small surface roughness is layered on a metal thin film having a great surface roughness Ra and a SiN thin film being a dielectric film having a small surface roughness Ra is further layered, the surface roughness Ra of the metal thin film being the lowest layer influences the surface roughnesses Ra of the metal film and the dielectric thin film being upper layers, irrespective of the small surface roughnesses Ra of the metal thin film and the dielectric thin film which are layered. As a result, the surface roughness Ra of the uppermost dielectric thin film approximates to the surface roughness Ra of the metal being the lowermost layer.

The application of the used sample as a reflective film will be described below in respect of heat conduction.

As described above, in the optical magnetic recording medium, when a laser beam is blocked, the recording film returns from a high temperature to an ordinary temperature cools while leaving the direction of an applied magnetic field at the Curie temperature recorded. Accordingly, it is desirable that the reflective film should have excellent heat conduction in order to shorten a time required for cooling.

In this context, an Ag unit or an Al unit has excellent heat conduction. On the other hand, the AgAl alloy has poor heat conduction. Accordingly, since the AgAl/SiN laminated film of the samples used in FIG. 4, has a small surface roughness Ra, but has poor heat conduction it is not suitable for a reflective film. On the contrary, since the Al/SiN thin film has excellent heat conduction, but has a very great surface roughness Ra, it is not suitable for the reflective film. Moreover, since the Al/AgAl/SiN thin film and the Ag/AgAl/SiN thin film are made by layering the Al thin film or the Ag thin film, they have excellent heat conduction, but still have great surface roughnesses Ra. Therefore, it is desirable that the surface roughnesses Ra should be reduced by some method.

Referring to FIG. 5, description will be given to the influence of a time required for sputter etching on the surface roughness Ra of the dielectric film when a metal thin film is subjected to the sputter etching and a dielectric film is then layered thereon.

FIG. 5 is a graph showing the influence of a time spent for the sputter etching on the surface roughness Ra of the SiN film when the Al/AgAl laminated film or the Ag/AgAl laminated film is subjected to the sputter etching for a constant time and a SiN film is further layered thereon.

In FIG. 5, an axis of abscissa indicates a time (min.) spent for the sputter etching and an axis of ordinate indicates a surface roughness Ra (nm) of the SiN film.

An Al/AgAl/SiN laminated film or an Ag/AgAl/SiN laminated film was used as a sample.

In this regard, a method of fabricating the sample will be described below.

The Al/AgAl/SiN laminated film is formed as follows. First of all, an Al/AgAl laminated film is formed on the same condition as the condition of the sample of the Al/AgAl/SiN laminated film described with reference to FIG. 4.

Then, an AgAl layer provided on the surface of the Al/AgAl laminated film is subjected to the sputter etching. The sputter etching was carried out on the condition of an Ar gas pressure of 0.30 Pa and a power of 50 W. Further, the time required for the sputter etching is set four ways of 0 min., 2 mins., 4 mins. and 6 mins.

Next, a SiN thin film is formed in a thickness of 20 nm on the Al/AgAl laminated film on the same condition as described with reference to FIG. 4.

For the four samples thus fabricated, the surface roughness Ra was measured.

For the Ag/AgAl/SiN laminated film, four samples are fabricated by the same method as the Al/AgAl/SiN laminated film described above.

As can be seen from FIG. 5, the Al/AgAl/SiN laminated film which is not subjected to the sputter etching has a surface roughness Ra of approximately 1.7 nm, whereas the Al/AgAl/SiN laminated film which is subjected to the sputter etching for six minutes has a small surface roughness Ra of approximately 1.2 nm.

Also, the Ag/AgAl/SiN laminated film which is not subjected to the sputter etching has a surface roughness Ra of approximately 0.9 nm, whereas the Ag/AgAl/SiN laminated film which is subjected to the sputter etching for six minutes has a small surface roughness Ra of approximately 0.5 nm.

From these results, it is apparent that a smoothing treatment for the metal thin film, namely, the sputter etching is carried out to reduce the surface roughness Ra of the metal thin film, thereby resulting in a reduction in the surface roughness Ra of the SiN film being a dielectric film layered thereon. In particular, it is clear that the Ag/AgAl/SiN laminated film can produce great effects.

With the surface roughness Ra of 1 nm or less, it can be supposed that the surface roughnesses Ra of the metal thin film and the SiN thin film formed thereon are almost equal to each other. The reason is as follows. Since the surface roughnesses Ra of the AgAl thin film in FIG. 3 and the AgAl/SiN laminated film in FIG. 4 are almost equal to each other and the surface roughnesses Ra of the Ag thin film in FIG. 3 and the Ag/AgAl/SiN laminated film in FIG. 4 are almost equal to each other, it is possible to estimate that the surface roughnesses of the metal thin film and the SiN thin film formed thereon are almost equal to each other.

Referring to FIG. 6, description will be given to the relationship between a surface roughness and a noise level which is obtained when a metal film is subjected to a flattening treatment.

FIG. 6 is a graph showing the relationship between a surface roughness Ra and a noise level for an optical magnetic recording medium having a recording layer, a dielectric film and a light transmission film formed on the laminated film obtained in the example of FIG. 5.

As can be seen from FIG. 6, an axis of abscissa indicates a surface roughness Ra (nm) of a sample and an axis of ordinate indicates a noise level (dBm) of each of a recording noise and an erasing noise.

In this context, a method of fabricating the used sample will be described below.

First of all, there were fabricated the same samples as the four samples of the Ag/AgAl/SiN laminated film described with reference to FIG. 5 and the same sample as the sample of the Al/AgAl/SiN laminated film which was subjected to the sputter etching for two minutes.

Next, a MO layer having two layers of TbFeCO and GdFeCo was formed in a total thickness of 15 nm on each of these SiN thin film by a sputtering method on the condition of a gas pressure of 0.30 Pa and a power of 1.2 kW in the mixed atmosphere of Ar and $N_2$.

Then, a SiN thin film was formed on the MO layer on the same condition as described with reference to FIG. 4.

Furthermore, an organic protective film was formed of an ultraviolet curing type resin (trade name: SD-301 manufactured by Dainippon Ink Co., Ltd.) in a thickness of 20 μm on the SiN thin film.

For the sample thus fabricated, the noise level of each of the recording noise and the erasing noise was measured.

The noise level was measured by using a measuring device (trade name: R3261A SPECTRUM ANALYZER manufactured by Advantest Co., Ltd.) according to the following method.

Erasing noise: noise level at 1 MHz which is obtained after DC erase in one direction linear velocity 2.8 m/s, reproducing power 1 mW Recording noise: noise level at 1 MHz which is obtained by reproduction after recording one round at the same frequency (mark length of 1.12 μm)

linear velocity 2.8 m/s, reproducing power 1 mW

As is apparent from FIG. 6, when the surface roughness Ra of the reflective film is changed, the disk noises such as the erasing noise and the recording noise of the optical recording medium are greatly reduced.

In this case, an erasing noise of −60 dB or less is sufficiently suitable for practical use. The surface roughness Ra is corresponding to the erasing noise equivalent to −60 dB or less, approximately 0.75 nm or less. Accordingly, it is desirable that an optical recording medium should have such a structure as has surface roughness Ra of a reflective film of 0.75 nm or less.

For the following reason, it is assumed that the erasing noise and the recording noise can be reduced by decreasing the surface roughness Ra of the reflective film.

Specifically, because the surface of the reflective film is subjected to a smoothing treatment, scattered light on the reflective film can be reduced.

Moreover, because the reflective film is subjected to the smoothing treatment, a dielectric film and a recording film formed on the reflective film are flattened. Therefore, it is assumed that magnetic characteristics can be improved by flattening the recording film.

Next, description will be given to the relationship between a frequency and an erasing noise level with reference to FIG. 7.

Figure 7:
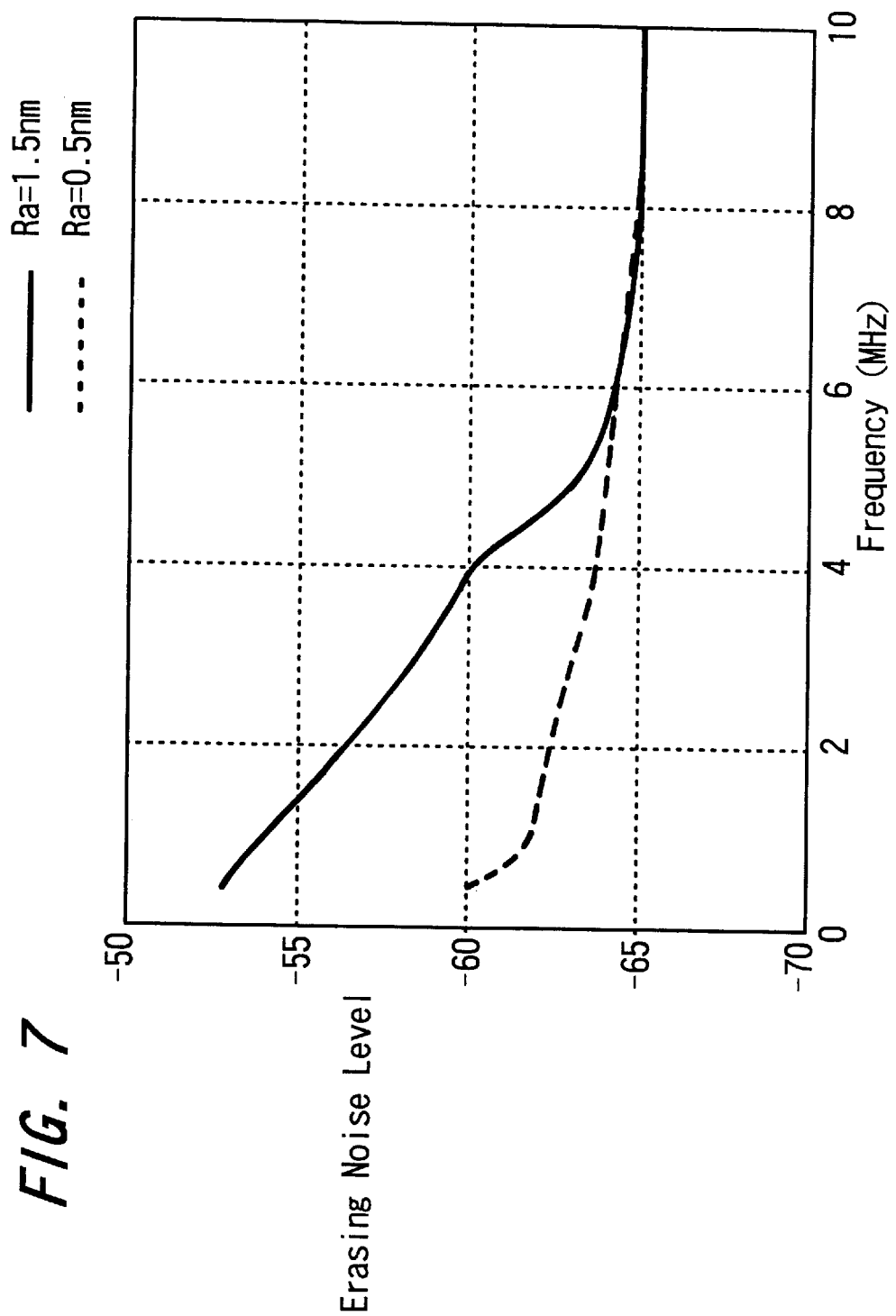
FIG. 7 is a graph showing the relationship between an erasing noise level and a frequency which is obtained with a surface roughness Ra of 1.5 nm and 0.5 nm.

FIG. 7 is a graph showing the relationship between the frequency and the erasing noise level which is obtained with a surface roughness Ra of 1.5 nm and 0.5 nm.

In FIG. 7, an axis of abscissa indicates a frequency (MHz) and an axis of ordinate indicates an erasing noise level (dBm).

The sample having surface roughnesses Ra of 0.5 nm and 1.5 nm as described with reference to FIG. 6 are used herein.

As is seen from FIG. 7, when the erasing noise level is measured with those of Ra=0.5 nm and Ra=1.5 nm, the erasing noise level is reduced with the smaller surface roughness Ra within the frequency range of 6 MHz or less.

Practically, a frequency of 1 to 5 MHz is important. Therefore, this frequency range produces the effect that the erasing noise is reduced with a decrease in the surface roughness Ra.

As described above, according to the present embodiment, because the surface of the reflective film is subjected to the smoothing treatment, the disk noises such as the erasing noise, the recording noise and the like can be reduced. To be specific, the disk noises such as the erasing noise, the recording noise and the like can be reduced by decreasing the surface roughness Ra of the reflective film of the optical recording medium to 0.75 nm or less.

By using the optical recording medium according to the present invention, the disk noises such as the erasing noise, the recording noise and the like can be reduced, as a result of which, it is possible to obtain a greater CNR (Carrier to noise ratio, i.e., a ratio of a carrier level to an effective value of a random noise. It is also referred to as C/N or a CN ratio), which in turn leads to a great improvement in the recording density of the optical recording medium.

While the example in which the metal film is subjected to the flattening treatment has been described in the embodiment of the present invention, the dielectric film formed as the substrate of the recording film may be subjected to the smoothing treatment in place of the flattening treatment of the metal film. In other words, the same effects as in the embodiment of the present invention described above can be obtained by the sputter etching of the dielectric film.

Specifically, it is possible to reduce the disk noises a such as the erasing noise, the recording noise and the like by carrying out the smoothing treatment on at least one of the surfaces of the dielectric films formed as the substrate layer of the recording film. Particularly, it is possible to greatly reduce the disk noises such as the erasing noise, the recording noise and the like of the optical recording medium by making the surface roughness Ra of the dielectric film equal to 0.75 nm or less.

The reason is as follows. If at least one of the surfaces of the dielectric films is subjected to the smoothing treatment, the recording film formed on the dielectric film is flattened. Thus, the magnetic characteristics can be improved.

In consideration of the example described in the embodiment of the present invention together with the foregoing point, it will be sufficient that at least one of the surfaces of the reflective film and the dielectric film is subjected to the smoothing treatment. Thus, if at least one of the surfaces of the reflective film and the dielectric film is subjected to the smoothing treatment, it is possible to reduce the disk noises such as the erasing noise, the recording noise and the like.

The reason is as follows. If the reflective film is subjected to the smoothing treatment, it is possible to improve the magnetic characteristics by reducing the scattered light on the reflective film and flattening the recording film. Moreover, if at least one of the surfaces of the dielectric film is subjected to the smoothing treatment, the magnetic characteristics can be improved by flattening the recording film.

While the sputter etching method has been described as a method of reducing the surface roughness Ra of the metal film in the embodiment of the present invention described above, it is not restricted to this method. Specifically, it is also possible to employ a method using a film forming apparatus, for example, an ion beam sputter (IBS) as another method of reducing the surface roughness Ra of the metal film.

Although the so-called disk-shaped optical magnetic disk has been described in the embodiment of the present invention described above, the present invention is not restricted to such an optical magnetic disk and shape, but can be applied to various optical recording media having a metal thin film on an information layer, for example, an optical magnetic disk having two or more information layers, an optical disk having a single information layer or more, a phase-change optical disk, other recording media having the shape of a card or sheet, and the like.

Furthermore, various structures can be used. For example, two information layers or more are formed on each of two transparent substrates, the faces of the transparent substrates being joined against each other and light being irradiated from the opposite side to the transparent substrate.

Moreover, the present invention is not limited to the above-mentioned embodiment, but can employ various structures without departing from the scope of the present invention.

The present invention has the following effects.

Since the surface of the reflective film is subjected to the smoothing treatment or at least one of the surfaces of the reflective film and the dielectric film is subjected to the smoothing treatment, disk noises such as an erasing noise, a recording noise and the like can be reduced.

Having described preferred embodiments of the invention with reference to the accompanying drawings, it is to be understood that the invention is not limited to those precise embodiments and that various changes and modifications could be effected therein by those skilled in the art without departing from the spirit or scope of the invention as defined in the appended claims.

What is claimed is:

1. A method of manufacturing an optical recording medium in which light is irradiated from an opposite side to a substrate, thereby causing recording and/or reproduction on a recording film to be carried out, comprising the steps of:

preparing a substrate;

forming a reflective film on a substrate;

performing a smoothing treatment on a surface of the reflective film; and forming a recording film on the thus treated reflective film.

2. The method of manufacturing an optical recording medium according to claim 1, wherein the smoothing treatment sets a surface roughness Ra of the reflective film equal to 0.75 nm or less.

3. The method of manufacturing an optical recording medium according to claim 1, wherein the smoothing treatment is sputter etching.

4. A method of manufacturing an optical recording medium in which light is irradiated from an opposite side to a substrate, thereby causing recording and/or reproduction on a recording film to be carried out, comprising the steps of:

preparing a substrate;

sequentially forming a reflective film and a dielectric film on a substrate;

performing a smoothing treatment on at least one of surfaces of the reflective film and the dielectric film; and forming a recording film on the dielectric film.

5. The method of manufacturing an optical recording medium according to claim 4, wherein the smoothing treatment sets a surface roughness Ra of the dielectric film equal to 0.75 nm or less.

6. The method of manufacturing an optical recording medium according to claim 4, wherein the smoothing treatment is sputter etching.

7. An optical recording medium in which at least a reflective film and a recording film are sequentially formed on a substrate and light is irradiated from an opposite side to the substrate, thereby causing recording and/or reproduction on the recording film to be carried out, wherein the reflective film has a surface roughness Ra of 0.75 nm or less.

8. An optical recording medium in which at least a reflective film, a dielectric film and a recording film are sequentially formed on a substrate and light is irradiated from an opposite side to the substrate, thereby causing recording and/or reproduction on the recording film to be carried out, wherein the dielectric film has a surface roughness Ra of 0.75 nm or less.

* * * * *